United States Patent
Lenferink et al.

(10) Patent No.: US 7,252,726 B2
(45) Date of Patent: Aug. 7, 2007

(54) METHOD FOR PREPARING A FABRIC SUBSTANTIALLY CONSISTING OF CARBON FIBERS

(75) Inventors: Robert Gerardus Lenferink, Tubbergen (NL); Wilhelmus Hendrikus Maria Van Dreumel, Nijverdal (NL)

(73) Assignee: Ten Cate Advanced Composites B.V., Nijverdal (NL)

( * ) Notice: Subject to any disclaimer, the term of this patent is extended or adjusted under 35 U.S.C. 154(b) by 162 days.

(21) Appl. No.: 10/392,289

(22) Filed: Mar. 19, 2003

(65) Prior Publication Data

US 2004/0007791 A1     Jan. 15, 2004

Related U.S. Application Data

(63) Continuation-in-part of application No. 09/226,291, filed on Jan. 7, 1999, now abandoned.

(30) Foreign Application Priority Data

Jan. 8, 1998   (NL) ................................... 1007987

(51) Int. Cl.
*C08J 5/05* (2006.01)
*B32B 5/28* (2006.01)

(52) U.S. Cl. .................. 156/89.26; 156/320; 156/322; 156/334; 156/315; 427/381; 427/386

(58) Field of Classification Search ............... 156/320, 156/322, 334, 315, 89.26; 427/381, 386
See application file for complete search history.

(56) References Cited

U.S. PATENT DOCUMENTS

| | | | |
|---|---|---|---|
| 3,690,939 A | 9/1972 | Wegmann et al. | |
| 3,818,082 A * | 6/1974 | Burns et al. | ................. 264/345 |
| 4,364,993 A * | 12/1982 | Edelman et al. | ......... 428/298.7 |
| 4,409,288 A | 10/1983 | Spain | |
| 4,446,255 A | 5/1984 | Ying et al. | |
| 4,555,446 A | 11/1985 | Sumida et al. | |
| 4,604,319 A | 8/1986 | Evans et al. | |
| 4,714,642 A * | 12/1987 | McAliley et al. | ........... 428/113 |
| 4,925,729 A * | 5/1990 | O'Connor | ................... 442/198 |
| 5,212,010 A | 5/1993 | Curzio et al. | |
| 5,230,956 A * | 7/1993 | Cole et al. | .................. 428/367 |

FOREIGN PATENT DOCUMENTS

| | | |
|---|---|---|
| DE | 30 24 609 A1 | 1/1982 |
| EP | 0 045 574 A1 | 2/1982 |

OTHER PUBLICATIONS

Abstract of JP 62 021 872, (Toho Rayon KK) "Carbon Fibre Reinforced Polyimide Resin Coating Size Composition Contain Poly Maleimide Polyepoxide Resin" as reported in Database WPI. Section Ch. Week 8710. Derwent Publications Ltd., AN 87-068721; 1 page.

Abstract of JP 62 021 872, (Toho Rayon KK) "Carbon Fibre Reinforced Polyimide Resin Coating Size Composition Contain Poly Maleimide Polyepoxide Resin" as reported in Database WPI. Section Ch. Week 8710. Derwent Publications Ltd., AN 87-068721; 1 page, Jan. 30, 1987.

* cited by examiner

*Primary Examiner*—Richard Crispino
*Assistant Examiner*—Barbara J. Musser
(74) *Attorney, Agent, or Firm*—The Webb Law Firm

(57) ABSTRACT

A method for preparing a carbon fiber fabric impregnated with a thermoplastic plastic including providing a fabric which substantially consists of carbon fibers with a coating of an epoxy material without curing agent; bringing the fabric to a temperature in the range of 330° C. to 430° C.; and holding the fabric at the temperature for 120 to 240 minutes such that the carbon fibers remain unaffected and the epoxy material is aged or neutralized and loses its tacky character. Alternatively, the heat treatment may be carried out by bringing the fabric to a temperature of 450±70° C. for 15±5 minutes and subsequently to a temperature of 220±30° C. for 240±60 minutes. Fabrics prepared as described may be used in preparing laminates, which include a plurality of layers consisting alternately of the above-described fabric and a layer of thermoplastic plastic.

12 Claims, No Drawings

METHOD FOR PREPARING A FABRIC SUBSTANTIALLY CONSISTING OF CARBON FIBERS

CROSS REFERENCE TO RELATED APPLICATION

This application is a continuation-in-part of U.S. application Ser. No. 09/226,291, filed Jan. 7, 1999, now abandoned, entitled "Method for Preparing a Fabric Substantially Consisting of Carbon Fibers," which claimed the priority benefit of Netherlands Patent Application No. 1007987, filed Jan. 8, 1998, the disclosure of which is hereby incorporated by reference.

BACKGROUND OF THE INVENTION

1. Field of the Invention

The present invention relates to a method for preparing carbon fiber fabric and, in particular, carbon fiber fabric impregnated with thermoplastic plastic.

2. Description of Related Art

Before glass fibers are formed into a fabric a protective coating is applied to the fibers. This coating is removed after the weaving by subjecting the glass fabric to a high temperature for quite a long time. A typical cycle comprises a temperature of about 400° C. for a period of 70 hours. The coating, generally designated as "strong layer," usually consists of PVA (polyvinyl alcohol) or starch. During the heating process, the protective coating is completely burned away, which can be easily checked by determining the weight of the fabric before and after the relevant heating treatment. In order to prepare glass fabric for impregnation after the heat treatment, a more suitable coating is added to the glass fiber material for adhesion to plastic systems. Typical materials for coatings are chromium (III) and siloxane complexes.

Lightweight composite materials for structural applications are manufactured by combining carbon fibers with a plastic matrix. For space travel, aviation, and industrial applications, the plastic is added to the fibers by an impregnation process. If the impregnation process is carried out on a fiber system in which all fibers run substantially parallel to each other, the product in question is designated as unidirectional tape.

Carbon fibers are easily damaged by friction forces. However, no protection for the carbon fibers is necessary for the impregnation process for the unidirectional tape since no friction forces occur between the individual fibers.

If, however, the fibers are combined into a fabric, friction occurs between the fibers during insertion of the filling fibers perpendicular to the warp fibers. As a result of these friction forces, carbon fibers are easily damaged during the weaving process.

In order to facilitate the weaving process, carbon yarns are provided in advance by the supplier with a standard sizing, which consists of, for instance, 0.5-1% unsaturated epoxy material. This sizing does not have to be removed if the fabric is subsequently impregnated with a curing plastic system.

U.S. Pat. Nos. 4,555,446 and 4,446,255 describe how an epoxy sizing can be arranged onto carbon fibers. The sizing agent contains a solvent for arranging the agent onto the carbon fibers. Subsequently, the fibers with the sizing agent are dried at an elevated temperature in order to remove the solvent from the agent. According to U.S. Pat. No. 4,555,446, the temperature should not exceed 250° C. as the sizing would undergo heat deterioration.

The epoxy-based sizing is compatible with most thermosetting plastic systems. However, for impregnation with a thermoplastic matrix, the epoxy sizing does have an adverse effect on the adhesion between fiber and plastic.

For these reasons, material impregnated with a thermoplastic has only been made commercially available in the form of unidirectional tape. The manufacturing process of said unidirectional tapes uses fibers which are not provided with a coating or sizing. So as to enable weaving and nevertheless ensure sufficient adhesion between fibers and plastic, the epoxy sizing has to be neutralized after the weaving process.

Much attention has been devoted to this problem, and the industry is still seeking a method of removing or neutralizing the epoxy sizing on carbon fibers after the weaving process, and is seeking to find a method to improve the adhesion between carbon and thermoplastic plastic, and thus provide a basis for a reliable composite material for structural applications.

SUMMARY OF THE INVENTION

The present invention is directed to a method for preparing a fabric substantially consisting of carbon fibers for impregnation with a thermoplastic plastic. The method includes the steps of:

(a) providing a fabric which substantially consists of carbon fibers with a coating of an epoxy material without curing agent; and (b) bringing the fabric to a temperature in the range of 330° C. to 430° C. and holding the fabric at the temperature for 120 to 240 minutes such that the carbon fibers remain unaffected and the epoxy material is aged or neutralized and loses its tacky character.

The present invention is further directed to a method of preparing a fabric substantially consisting of carbon fibers for impregnation with a thermoplastic plastic including:

(a) providing a fabric which substantially consists of carbon fibers with a coating of an epoxy material without a curing agent; and (b) bringing the fabric to a temperature of 450±70° C. for 15±5 minutes and subsequently to a temperature of 220±30° C. for 240±60 minutes.

The present invention is additionally directed to a method for manufacturing a laminate, which includes a plurality of layers consisting alternately of a fabric prepared according to the methods described above and a layer of thermoplastic. The laminate is formed by impregnating each layer of prepared fabric with the material of the layer of thermoplastic plastic. The impregnation takes place at increased temperature.

DETAILED DESCRIPTION OF THE INVENTION

With a view to the aforementioned problems, the invention provides a method for preparing a fabric that includes carbon fibers that are impregnated with a thermoplastic plastic. The method includes the following steps of:

(a) providing a fabric which substantially consists of carbon fibers with a coating of an epoxy material without a curing agent; and (b) bringing the fabric to a temperature in the range of 330° C. to 430° C. and holding the fabric at the temperature for 120 to 240 minutes such that the carbon fibers remain unaffected and the epoxy material is aged or neutralized and loses its tacky character.

In contrast to glass fiber, no additional sizing is added to the fiber material after the described thermal treatment. The epoxy sizing is still present after the thermal treatment, which can be determined by a weight comparison.

Although the epoxy coating, which was added to the fibers in order to be able to weave the carbon fiber fabric, is still present, the nature of the coating changes due to this process of artificial thermal aging. The layer loses the reactivity and stickiness and forms a neutral base for adhesion to a thermoplastic plastic.

After the carbon fibers have been formed into a fabric, this fabric is brought to an increased temperature. This temperature must be high enough to neutralize the tacky epoxy resin and also low enough to ensure that the mechanical properties of the carbon fibers are not adversely affected.

The present method improves the adhesion between the carbon fibers and the thermoplastic. When adhesion is poor, the bond between a carbon fiber and the thermoplastic will break. Separation of a fiber from the thermoplastic can start a microcrack. The number of microcracks is, therefore, proportional to the strength of the adhesion between carbon fibers and thermoplastic. When the adhesion is better or stronger, there will be fewer microcracks. The number of microcracks directly reflects mechanical properties, such as rupture of the carbon fibers, because the carbon fibers tend to rupture at the site of a microcrack. Thus, improvement of the adhesion results in improvement of the mechanical properties.

A method in which the coating amounts to roughly 0.3-2% by weight of the fabric provides a very good compromise between the realization of desired effects and the use of relatively little epoxy material.

The invention also relates to a prepared fabric obtained by applying one of the above-described methods. This fabric consists substantially of carbon fibers with a coating of aged or neutralized epoxy material.

The invention further relates to a method for manufacturing a laminate comprising a number of layers, consisting alternately of a prepared fabric according to the specification given in the previous paragraph and a layer of thermoplastic plastic. The laminate is formed by impregnating at increased temperature each layer of prepared fabric with the material of the layer of thermoplastic plastic. The impregnation takes place at increased temperature and optionally under increased pressure, where the layer of thermoplastic plastic can consist of a pre-manufactured foil, a powder-like or granular layer or is formed by co-extrusion.

A specific method herein consists of the thermoplastic plastic being semi-crystalline.

In a determined embodiment, the method is performed such that the thermoplastic plastic is PPS (polyphenylene sulfide).

A preferred embodiment of the method for manufacturing a laminate has the special feature that the thermoplastic plastic is PPS (polyphenylene sulfide).

A greatly reduced viscosity of the PPS, such as a viscosity comparable to the viscosity of water, for example in the range of 75 to 210 Pa·S, facilitates the impregnation process.

The latter described method can advantageously have the special feature that said temperature amounts to $(310\pm30)°$ C.

The crystalline character of the PPS can be adjusted by a method according to which the formed laminate is guided for cooling purposes over a cooling roller. It is possible to determine from the temperature of this cooling roller whether the thermoplastic plastic, in particular PPS, is amorphous or crystalline or a hybrid form therebetween. At temperatures below 160° C., the plastic is predominantly amorphous; above 160° C., the plastic is predominantly crystalline.

Finally, the invention relates to a laminate obtained by applying the above-described method and comprising a number of layers consisting alternately of a prepared fabric described above consisting substantially of carbon fibers with a coating of aged or neutralized epoxy material and a layer of thermoplastic plastic, which latter layer is impregnated into said prepared fabric.

In order to demonstrate the difference between the fabric obtained utilizing the thermal treatment of the present invention and a fabric produced by utilizing only evaporative temperatures as in the cited prior art, the following comparative studies were performed.

COMPARATIVE EXAMPLE

A PPS carbon composite was made using a standard epoxy sizing described in the prior art, such as U.S. Pat. Nos. 4,446,255 to Ying et al.; U.S. Pat. No. 3,690,939 to Wegemann; U.S. Pat. No. 4,409,228 to Spain; U.S. Pat No. 5,212,010 to Curzio et al.; U.S. Pat. No. 4,555,446 to Sumida et al.; and U.S. Pat. No. 4,604,319 to Evans et al. using evaporative temperatures, higher than disclosed in the above-mentioned patents.

The following method was used:
- a roll of 140 ml fabric was placed in an oven'
- the temperature was increased to 260° C. and kept for 3 hours'
- the oven was cooled to room temperature and the fabric was used for composite production; and
- the resulting carbon-PPS composite was evaluated for micro-crack formation.

EXAMPLE ACCORDING TO THE INVENTION

A PPS carbon composite made using the thermal treatment of an epoxy sizing as disclosed in the present invention. During this second investigation, the same batch of fabric was used as for the first investigation.

The following method was used:
- a roll of 140 ml fabric was placed in an oven;
- the temperature was increased to 380° C. and kept for 3 hours;
- the oven was cooled to room temperature and the fabric was used for composite production; and
- the resulting carbon-PPS was evaluated for micro-crack formation.

TABLE I

|  | Comparative Ex. | Example acc. inv. |
|---|---|---|
| Fabric | CD0286.050.000.0000 (Standard Sizing) | CD0286.050.000.0000 (Standard Sizing) |
| Thermal treatment: |  |  |
| Temperature (EC) | 260 | 380 |
| Time (hr.) | 3 | 3 |
| Composite: |  |  |
| Resin | PPS | PPS |
| Micro-crack formation | More than 20 per mm$^2$ | Less than 3 per mm$^2$ |

The fabric CD0286.050.000.0000 is a woven carbon fiber product produced by Soficar, Abidos, France under the brand name Torayca. These Torayca carbon fibers have the specifications according to Table II.

TABLE II

| Characteristic | Unit | Min. | Max. | Max. % |
|---|---|---|---|---|
| Tensile strength | MPa | 4020 | — | 4.5 |
| Young modulus | GPa | 220 | 240 | 2.4 |
| Elongation at break | % | 1.6 | — | 4.6 |
| Mass per unit of length | g/1000 m | 192 | 204 | 1.9 |
| Density | g/cm$^3$ | 1.74 | 1.8 | 1.0 |
| Sizing amount | % | 0.8 | 1.6 | — |
| Untwist | T/m | 3S | 3Z | — |

The data demonstrates that when the evaporative temperatures disclosed by the prior art are utilized, the resulting composite is highly prone to microcracking, and that minimal microcracking occurs when the treatment of the present invention is used.

We claim:

1. A method for preparing a fabric substantially consisting of carbon fibers for impregnation with a thermoplastic plastic, which method comprises the following steps of:
   (a) providing a fabric which substantially consists of carbon fibers with a coating of an epoxy material without curing agent;
   (b) bringing the fabric to a temperature in the range of 330° C. to 430° C. and holding the fabric at the temperature for 120 to 240 minutes such that the carbon fibers remain unaffected, the epoxy material is aged or neutralized and loses its tacky character and the epoxy material remains present on the carbon fibers; and
   (c) adhering a thermoplastic plastic to the aged or neutralized epoxy material.

2. The method of claim 1, wherein the coating amounts to about 0.3-2% by weight of the fabric.

3. A method for manufacturing a laminate comprising a plurality of layers, consisting alternately of a fabric prepared according to the method of claim 1 and a layer of thermoplastic, which laminate is formed by impregnating each layer of prepared fabric with the material of the layer of thermoplastic plastic, wherein said impregnation takes place at increased temperature.

4. The method of claim 3, wherein the thermoplastic plastic is semi-crystalline.

5. The method of claim 3, wherein the thermoplastic plastic comprises polyphenylene sulfide.

6. The method of claim 5, wherein the laminate is formed at a temperature at which the polyphenylene sulfide material has a greatly reduced viscosity.

7. The method of claim 6, wherein said temperature is 310±30° C.

8. The method of claim 6, wherein the formed laminate is guided for cooling purposes over a cooling roller.

9. The method of claim 6, wherein said impregnation takes place under increased pressure.

10. The method of claim 6, wherein the viscosity of the polyphenylene sulfide is about 75 to 210 Pa.S.

11. The method of claim 5, wherein the layer of thermoplastic plastic is a pre-manufactured foil, a powder-like or granule layer, or is formed by extrusion.

12. A method of preparing a fabric substantially consisting of carbon fibers for impregnation with a thermoplastic plastic comprising:
   (a) providing a fabric which substantially consists of carbon fibers with a coating of an epoxy material without a curing agent;
   (b) bringing the fabric to a temperature of 450±70°C. for 15±5 minutes and subsequently to a temperature of 220±30° C. for 240±60 minutes. whereuvon the epoxy material is aged or neutralized and loses its tacky character but remains present on the carbon
   (c) causing a thermonlastic plastic to be adhered to the aged or neutralized epoxy material.

* * * * *

UNITED STATES PATENT AND TRADEMARK OFFICE
CERTIFICATE OF CORRECTION

| | | |
|---|---|---|
| PATENT NO. | : 7,252,726 B2 | Page 1 of 1 |
| APPLICATION NO. | : 10/392289 | |
| DATED | : August 7, 2007 | |
| INVENTOR(S) | : Lenferink et al. | |

It is certified that error appears in the above-identified patent and that said Letters Patent is hereby corrected as shown below:

Column 6, Line 32, Claim 12, "whereuron the epoxy" should read -- whereupon the epoxy --

Column 6, Line 34, Claim 12, "on the carbon" should read -- on the carbon fibers; and --

Column 6, Line 35, Claim 12, "thermonlastic plastic" should read -- thermoplastic plastic --

Signed and Sealed this

Fourth Day of December, 2007

JON W. DUDAS
*Director of the United States Patent and Trademark Office*